(12) United States Patent
Fein et al.

(10) Patent No.: US 8,381,112 B2
(45) Date of Patent: Feb. 19, 2013

(54) DATA MANAGEMENT TOOL

(75) Inventors: Gene Fein, Malibu, CA (US); Edward Merritt, Lenox, MA (US)

(73) Assignee: Empire Technology Development LLC, Wilmington, DE (US)

( * ) Notice: Subject to any disclaimer, the term of this patent is extended or adjusted under 35 U.S.C. 154(b) by 720 days.

(21) Appl. No.: 12/481,554

(22) Filed: Jun. 9, 2009

(65) Prior Publication Data

US 2010/0313137 A1    Dec. 9, 2010

(51) Int. Cl.
*G06F 3/00*    (2006.01)
(52) U.S. Cl. ............ 715/741; 715/765; 709/217
(58) Field of Classification Search .......... 715/741, 715/765, 781, 835; 434/157, 362; 709/217
See application file for complete search history.

(56) References Cited

U.S. PATENT DOCUMENTS

| 5,494,444 A * | 2/1996 | Thayer et al. ................. 434/362 |
| 5,845,303 A * | 12/1998 | Templeman ................. 715/255 |
| 5,865,625 A * | 2/1999 | Baskerville ................. 434/157 |
| 5,904,485 A * | 5/1999 | Siefert ................. 434/322 |
| 6,185,684 B1 * | 2/2001 | Pravetz et al. ................. 713/182 |
| 7,398,473 B2 * | 7/2008 | Stoner et al. ................. 715/762 |
| 7,454,708 B2 * | 11/2008 | O'Neal et al. ................. 715/730 |
| 7,810,046 B2 * | 10/2010 | Hiraoka et al. ................. 715/810 |
| 8,160,865 B1 * | 4/2012 | Coughlan et al. ................. 704/4 |
| 2003/0041117 A1 * | 2/2003 | Dozier et al. ................. 709/217 |
| 2003/0076352 A1 * | 4/2003 | Uhlig et al. ................. 345/738 |
| 2005/0086252 A1 * | 4/2005 | Jones et al. ................. 707/102 |
| 2007/0190512 A1 * | 8/2007 | Meimer et al. ................. 434/322 |
| 2007/0202481 A1 * | 8/2007 | Smith Lewis et al. ........ 434/323 |
| 2009/0077479 A1 * | 3/2009 | Tucci ................. 715/764 |

* cited by examiner

*Primary Examiner* — Phenuel Salomon
(74) *Attorney, Agent, or Firm* — Ren-Sheng International

(57) ABSTRACT

Embodiments of the disclosure set forth a computing device configured to support a data management tool. An example computing device includes a wireless communication module and a processing unit. The processing unit is configured to identify a wireless flash card having a first data of a first data type and a second data of a second data type as content and in a format specified by a template. The first data and the second data are displayed in a first display area and a second display area, respectively, based on the template and features of the computing device. Prior to operating on one or more of the first data and the second data, the processing unit is configured to establish whether such operations are permissible based on one or more of a first attribute and a second attribute set forth in the template.

20 Claims, 8 Drawing Sheets

700 A computer program product 702 at least one of one or more instructions for identifying a first wireless flash card having a first data of a first data type and a second data of a second data type as content and in a format specified by a first template based on the first data;

one or more instructions for displaying the first data and the second data in a first display area and a second display area, respectively, based on the first template and features of a first computing device;

prior to operating on one or more of the first data and the second data, one or more instructions for establishing permissibility of the operating based on one or more of a first attribute and a second attribute set forth in the first template; or one or more instructions for transmitting a part or whole of the first wireless flashcard via a wireless communication module of the computing device to a second computing device based on one or more of a third attribute and a fourth attribute set forth in the first template.

| 704 signal bearing medium | 708 computer readable medium |
| 706 communication medium | 710 recordable medium |

FIG. 7

800 A computer program product

802 at least one of one or more instructions for receiving a first data of a first data type for a first field of the first template;
one or more instructions for receiving a second data in a second data type for a second field of the first template;
one or more instructions for formulating the first dataset having the first data and the second data after establishing that the first data type and the second data type match a first permissible data type for the first field and a second permissible data type for the second field, respectively;
one or more instructions for displaying the first dataset based on the first template and features of the first computing device, wherein the first field corresponds to a first display area, and the second field corresponds to a second display area; or
one or more instructions for assigning a first attribute for the first field and a second attribute for the second field before transmitting a part or whole of the first wireless flashcard to a second computing device via the wireless communication device

| 804 signal bearing medium | 808 computer readable medium |
|---|---|
| 806 communication medium | 810 recordable medium |

FIG. 8

DATA MANAGEMENT TOOL

BACKGROUND

Description of the Related Art

Unless otherwise indicated herein, the approaches described in this section are not prior art to the claims in this application and are not admitted to be prior art by inclusion in this section.

A conventional flashcard was developed primarily as a learning aid. It usually contains a question-answer pair and is widely used to aid memorization of chosen facts relating to various topics. Because the conventional flashcard is paper-based, it typically contains information in certain data formats (e.g., textual data), and the information is neither frequently updated nor easily modified. In addition, paper-based flashcards are prone to wear and tear, potentially resulting in the loss of the information contained in the flashcards.

BRIEF DESCRIPTION OF THE DRAWINGS

The foregoing and other features of the present disclosure will become more fully apparent from the following description and appended claims, taken in conjunction with the accompanying drawings. These drawings depict only example embodiments in accordance with the present disclosure and are therefore not to be considered limiting. The disclosure will be described with additional specificity and detail through use of the accompanying drawings.

FIG. 7 is a schematic diagram illustrating an example computer program product for supporting a wireless flashcard; and FIG. 8 is a schematic diagram illustrating an example computer program product for generating a wireless flashcard, all arranged in accordance with at least some embodiments of the present disclosure.

DETAILED DESCRIPTION

Figure 1:
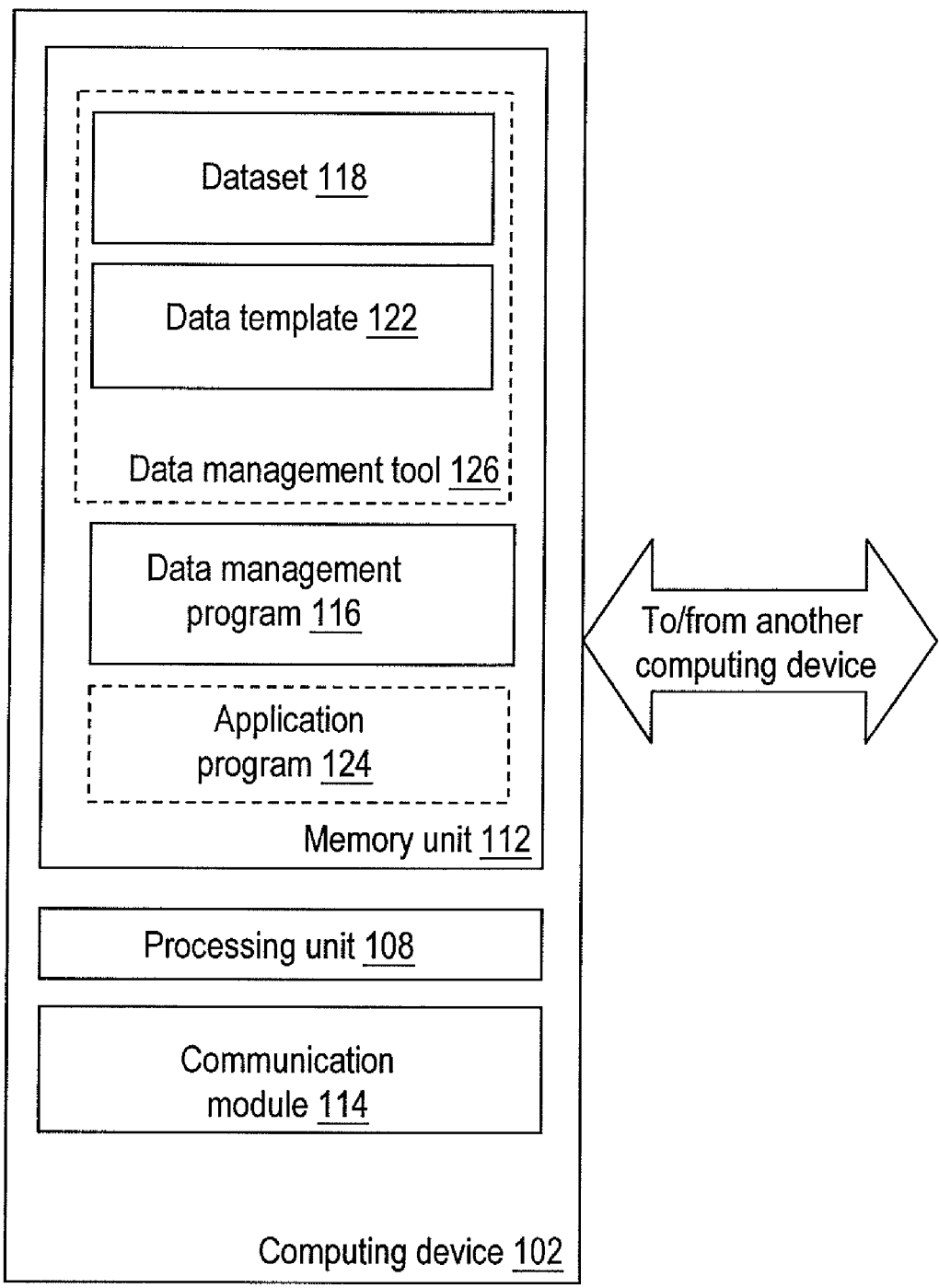
FIG. 1 is an example block diagram showing a computing device configured to support a data management tool.

In the following detailed description, reference is made to the accompanying drawings, which form a part thereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

FIG. 1 is an example block diagram showing a computing device 102 configured to support a data management tool 126, arranged in accordance with at least some embodiments of the present disclosure. The computing device 102 could be a portable device, a mobile phone, a laptop computer, or any other device with processing power. The computing device 102 could be connected to another computing device (not shown) through a point-to-point connection or a network connection.

The computing device 102 can include a memory unit 112, a processing unit 108, and a communication module 114. The memory unit 112 can store a data management program 116, a dataset 118, a data template 122, and an application program 124. The processing unit 108 is configured to execute the instructions of the software components (e.g., data management program 116) stored in the memory unit 112 and operate on the data stored in the memory unit 112. The communication module 114 is configured to interact with the processing unit 108 and also communicate with another computing device.

The dataset 118 generally refers to a collection of various types of data, such as, without limitation, textual data, audio data, video data, and color data. Specifically, a first data and a second data are considered to be of different types, if they have different data formats. For example, textual-based data and multimedia content are considered herein as different data types. In some instances, even if the first data and the second data have the same data format, they can still be considered to be of different data types. For instance, the textual information of a title and the textual information of a hyperlink are both textual-based data. However, because they convey different information (e.g., descriptions for the title and a reference to a location for the hyperlink), they are considered herein as different data types.

The data template 122 can include at least one data field (not shown) for receiving a predetermined data type. For example, one data field might be for receiving textual-based data, and another data field might be for receiving multimedia content. In some implementations, each data field corresponds to a display area in a display device supported by the computing device 102. In addition, the data template 122 can be adjustable and dynamic. For instance, the number and/or the placement of the data fields in the data template 122 may be modified; the attribute settings associated with the data fields (e.g., whether the data contained in a certain data field can be shared with or modified by another computing device) may be established and altered; and, the sizes of the data fields may be changed (e.g., the size of a data field may be increased to accommodate more textual information). Here, the dataset 118 and the data template 122 managed by the data management program 116 are broadly referred to as the data management tool 126. One example of the data management tool 126 is a wireless flashcard.

The data management program 116 is configured to load and output the data template 122, prompt data to be inputted according to the data template 122, or load and output the dataset 118 according to the data template 122. The data management program 116 could be customized, so that the loading, outputting, and the prompting could utilize the features of the computing device 102 that it runs on. In addition, the data management program 116 could be a standalone software component or a part of another software program supported by the computing device 102. Subsequent paragraphs will further detail operations of the data management program 116.

The application program 124 may be invoked to generate or operate on the dataset 118 in view of the data template 122. The application program 124 could be, without limitation, a data retrieval program, an internet browser, a document processor, a multimedia application program, or an image processing program. In some implementations, both the application program 124 and the data management program 116 are under the control of an operating system (not shown in FIG. 1) of the computing device 102.

The computing device 102 may receive dataset from a first computing device (not shown in FIG. 1) coupled to the computing device 102. In some implementations, the data management programs installed on the two computing devices are arranged to be compatible. Thus, after receiving both the dataset and the data template from the first computing device, the computing device 102 could still load and cause the received dataset to be displayed according to the received data template. Alternatively, the data management programs and the data templates in the two computing devices are arranged to be compatible. Therefore, after receiving the dataset from the first computing device, the computing device 102 could also load and cause the received dataset to be displayed according to the data template 122.

Figure 2:
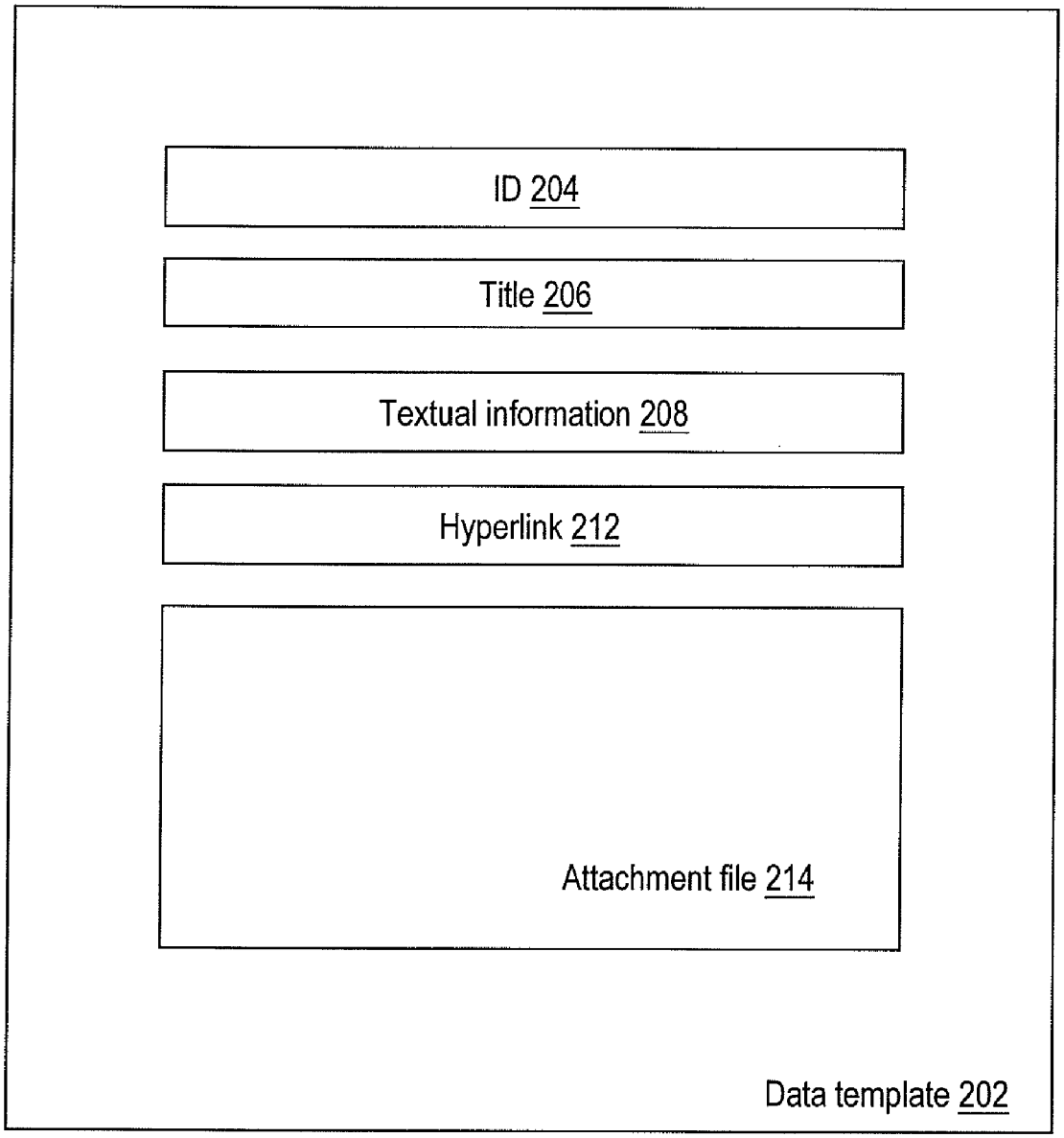
FIG. 2 is a schematic diagram showing an example data template.

FIG. 2 is a schematic diagram showing an example data template 202, arranged in accordance with at least some embodiments of the present disclosure. In some implementations, the data template 202 may correspond to the data template 122 of FIG. 1 and may include multiple data fields for receiving different data types. Here, a data field 204 is configured to receive identification-related data; data field 206 is configured to receive title-related data; data field 208 is configured to receive textual information relating to the title; data field 212 is configured to receive a hyperlink; and, data field 214 is configured to receive an attachment file. In some implementations, a data management program outputs the data template 202 to prompt input, waits to receive data, and determines whether the received data are appropriate for the data fields of the data template 202. The received data may be manually inputted (e.g., typed in or dragged and dropped), automatically generated, or retrieved from information sources, such as the Internet.

Figure 3:
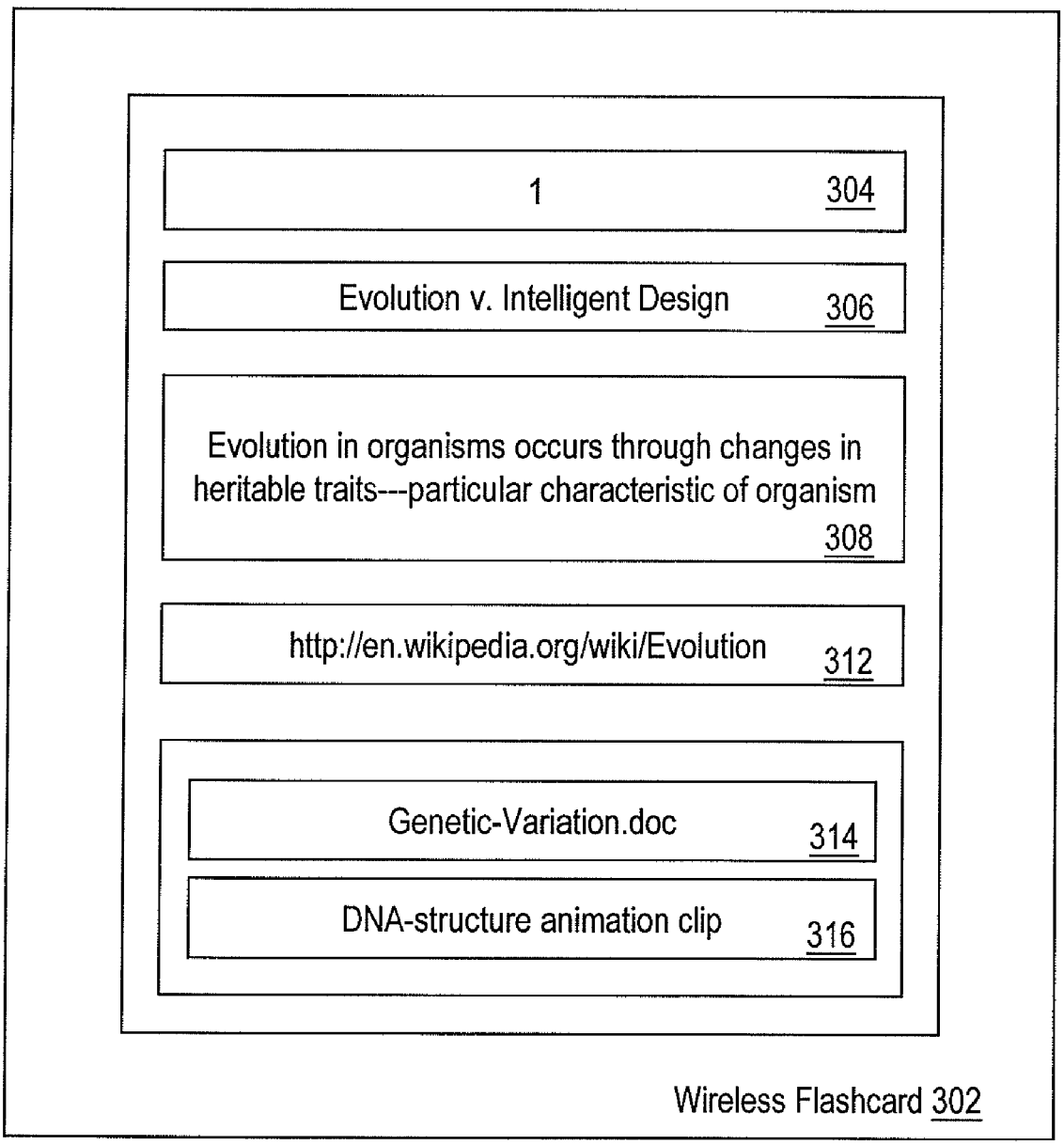
FIG. 3 is a schematic diagram showing an example wireless flashcard.

In conjunction with FIG. 2, FIG. 3 is a schematic diagram showing an example wireless flashcard 302, arranged in accordance with at least some embodiments of the present disclosure. In some implementations, the wireless flashcard 302 may correspond to the data management tool 126 of FIG. 1, and the data fields (e.g., 304, 306, 308, 312, 314, and 316) may correspond to the data fields of the data template 202 of FIG. 2. After a computing device receives data, the data management program of the computing device verifies whether the received data is of the appropriate data type for the designated data field of the data template before presenting the received data. For example, when the data management program determines that "1" for a data field 304 is indeed identification information, "1" is presented. In another example, when the data management program determines that "Evolution v. Intelligent Design" for a data field 306 is a title, the title is presented. In yet another example, when the data management program determines that the received textual information for a data field 308 is indeed related to the title information in the data field 306, the textual information is presented. Similarly, when the data management program determines that "http://en.wikipedia.org/wiki/Evolution" for a data field 312 is a hyperlink, the hyperlink is presented. When the data management program determines a Word document for a data field 314 and an animation clip for a data field 316 are attachment files, the Word document and the animation clip are presented. Although the wireless flashcard 302 is shown to include "1" in the data field 304, it could be identified in many other ways. For example, the wireless flashcard 302 may be identified for having a certain alphabet in the data field 304. In another example, the wireless flashcard 302 may be identified for having a certain combination of proper data types in different data fields, such as having a proper title in the data field 306 and having a proper hyperlink in the data field 312. In yet another example, the wireless flashcard 302 may be identified by having a certain color coding.

Figure 4:
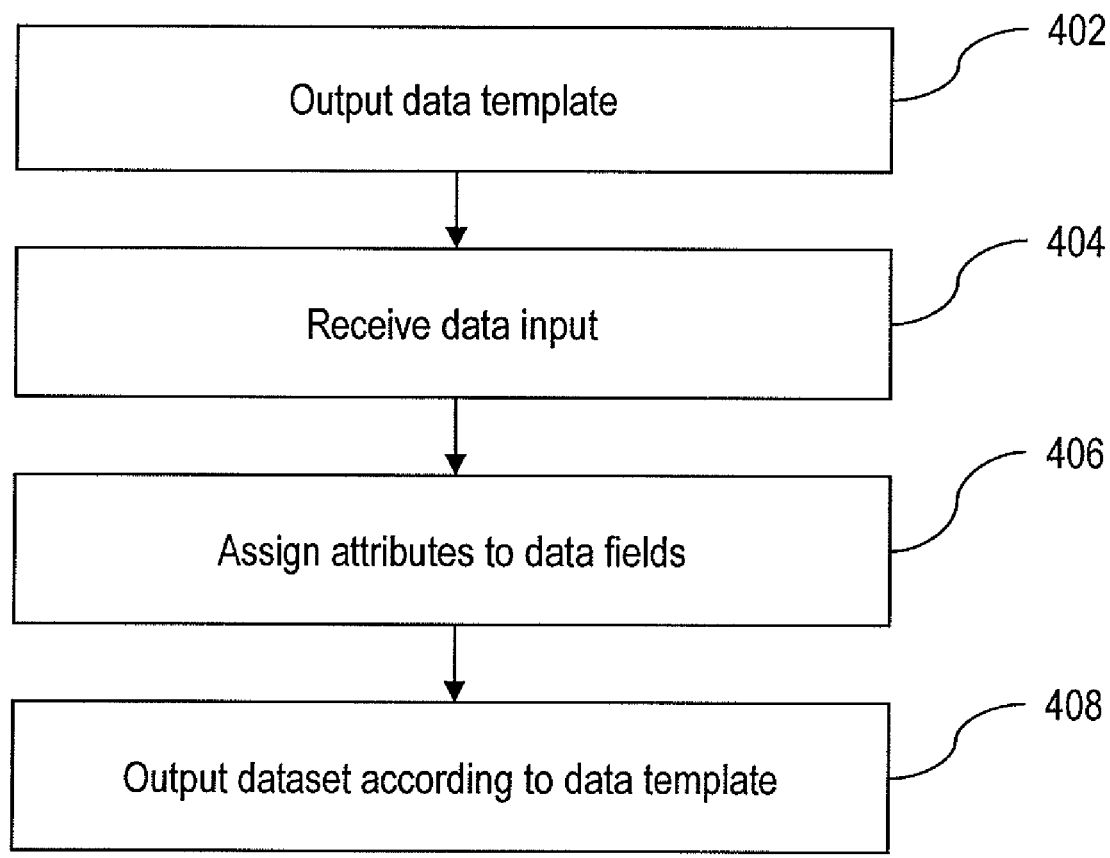
FIG. 4 is a flow chart illustrating an example process of generating a wireless flashcard.

FIG. 4 is an example flow chart illustrating a process of generating a wireless flashcard by a data management program, arranged in accordance with at least some embodiments of the present disclosure. In operation 402, the data management program outputs a data template and prompts for input. In operation 404, the data management program receives data input and determines whether the received data are of the proper data types for the data fields of the data template. If the received data are determined to have the proper data types, then they become a part of a dataset. In operation 406, the data management program assigns certain attributes to the data fields of the data template. In operation 408, the data management program outputs the dataset according to the data template. For example, the data management program may be configured to check the attributes assigned to selected data fields of the data template to determine whether the data in the selected data fields can be transferred, shared, or outputted. In another example, the data management program may be configured to output the dataset in the format consistent with the data template.

In some implementations, the outputting of the wireless flashcard corresponds to displaying the wireless flashcard on the display device coupled to a computing device. In addition, the data management program of the computing device may also be configured to perform the outputting operation based on a set of features specific to the computing device, such as, without limitation, fitting the wireless flashcard into a display window of a certain size or displaying the wireless flashcard based on how the computing device is held.

Moreover, the application program of the computing device may also be involved in operation 408. As mentioned above, the application program may be invoked to access the dataset. For example, the application program may be launched to access a hyperlink in the dataset and use the hyperlink to retrieve information from a linked webpage. The application program may also be launched to access a multimedia clip in the dataset and play back the clip.

In other implementations, the outputting of the wireless flashcard corresponds to sharing the wireless flashcard with another computing device. For example, the data management program may be configured to deliver a copy of the entire wireless flashcard or a copy of just the dataset to a receiving computing device. To further manage the sharing of the wireless flashcard, the data management program may be configured to limit accesses to the data in selected data fields within the wireless flashcard.

For example, the data in the selected data fields may not be allowed to be modified, commented on, or printed. One approach is for the data management program to assign a lock attribute to the selected data fields to restrict accesses. On the other hand, the data management program may allow the data in other data fields to be modified but at the same time require the modifications to reflect in the dataset in the computing device. One approach is for the data management program to assign an attribute to the editable data fields, so that when modifications are made, the modifications are reported back to the data management program. Subsequent paragraphs will detail how the receiving computing device may handle the received wireless flashcard.

Figure 5:
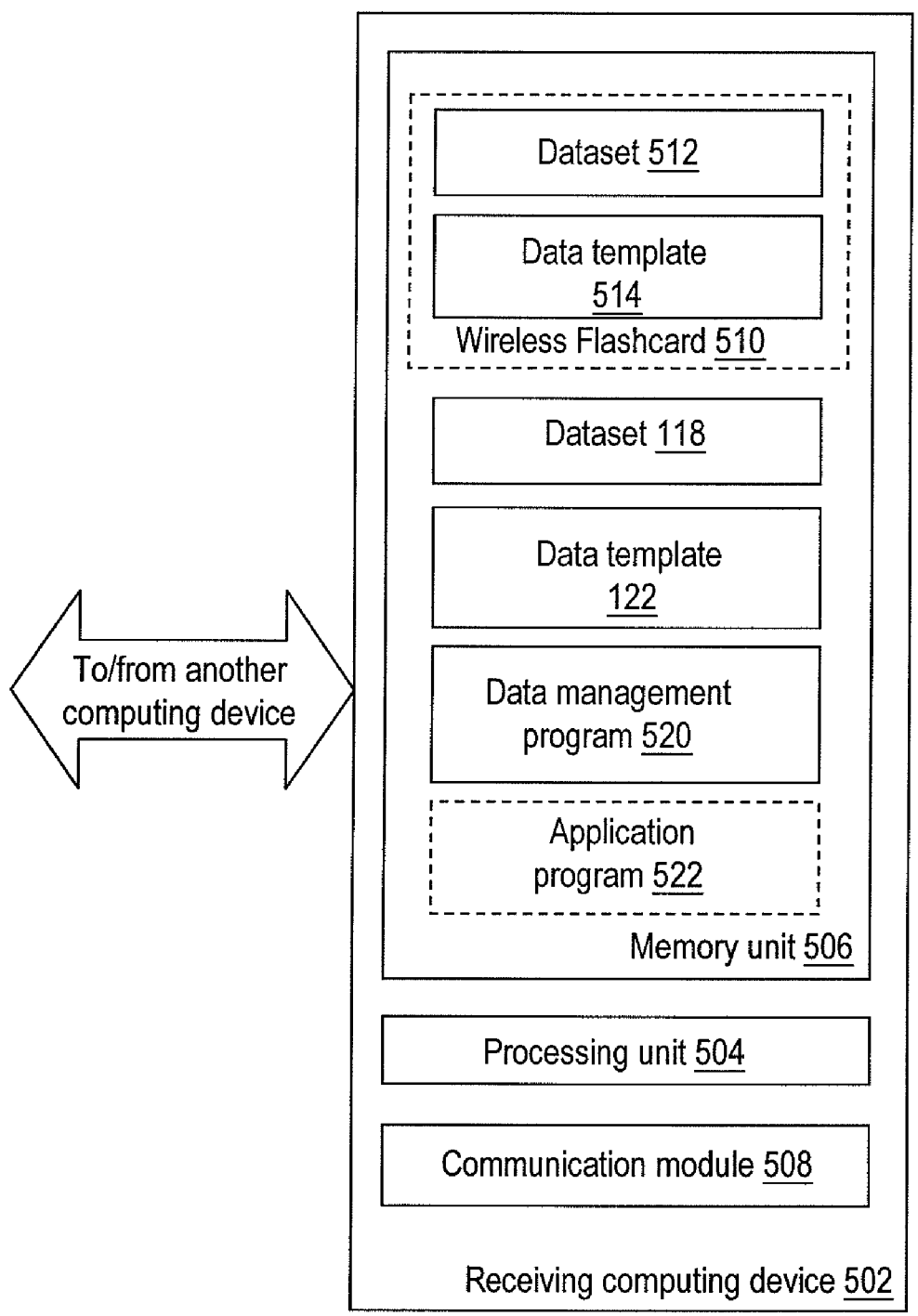
FIG. 5 is a block diagram showing an example receiving computing device configured to receive a wireless flashcard from a transmitting computing device.

FIG. 5 is a simplified block diagram showing an example receiving computing device 502 configured to receive a wireless flashcard from a transmitting computing device (e.g., the computing device 102 of FIG. 1), arranged in accordance with at least some embodiments of the present disclosure. The receiving computing device 502 may include a processing unit 504, a memory unit 506, and a communication module 508. The communication module 508 is configured to establish a communication link with the communication module of the transmitting computing device. The memory unit 506 may include a dataset 512, a data template 514, and a data management program 520. The dataset 512 and the data template 514 are referred to as a wireless flashcard 510. In addition, the data management program 520 is compatible with the data management program of the transmitting computing device (e.g., the data management program 116 of FIG. 1). After having received a copy of the wireless flashcard from the transmitting computing device (e.g., a copy of the data management tool 126 of FIG. 1), the memory unit 506 may store the copy (e.g., the dataset 118 and the data template 122). The memory unit 506 may optionally include an application program 522. In alternative implementations, the receiving computing device 502 may only receive a part of the wireless flashcard, such as the dataset, from the transmitting computing device.

Figure 6:
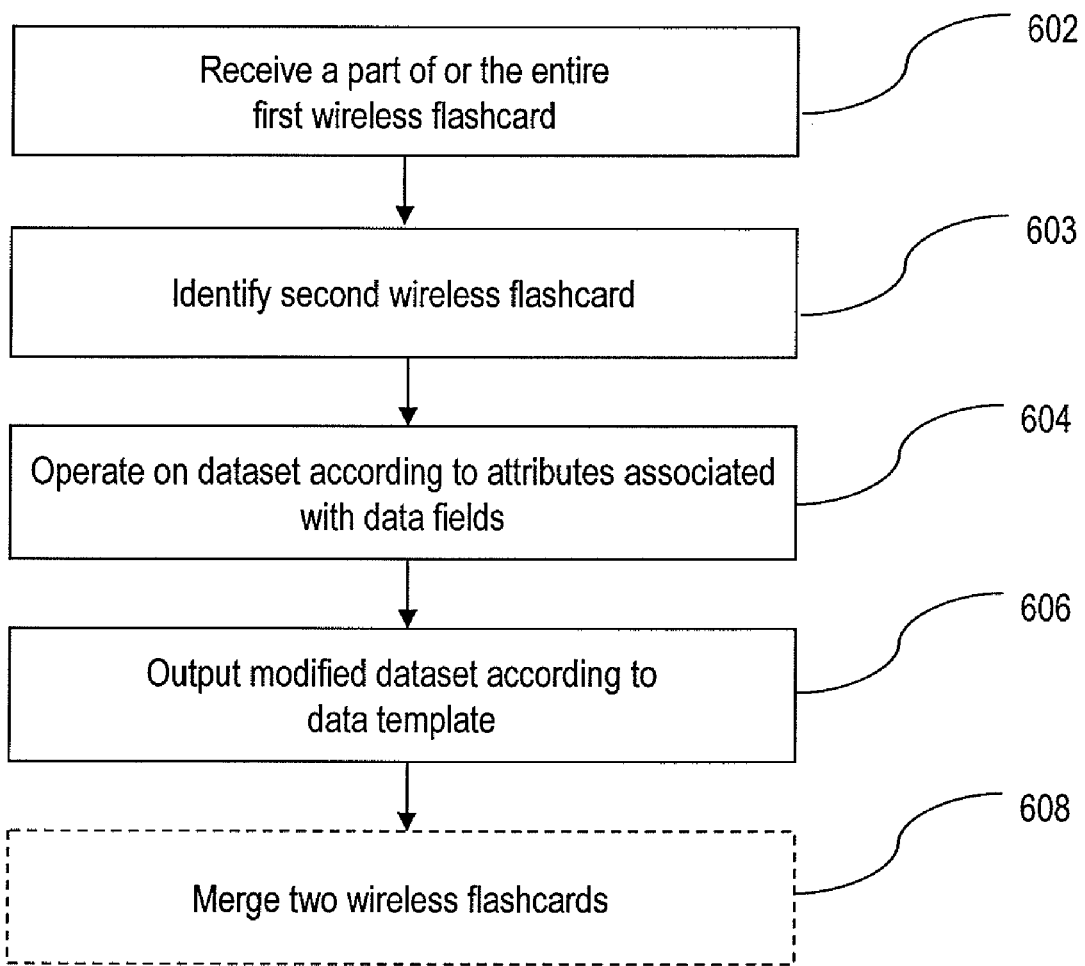
FIG. 6 is a flow chart illustrating an example process of handling a received wireless flashcard from a transmitting computing device.

In conjunction with FIG. 5, FIG. 6 is a flow chart illustrating an example process of handling a received wireless flashcard from a transmitting computing device, arranged in accordance with at least some embodiments of the present disclosure. Continuing with the example, suppose the transmitting computing device is the computing device 102 of FIG. 1, and the wireless flashcard from the computing device 102 and the wireless flashcard 510 are related (e.g., belonging to the same set of wireless flashcards). In operation 602, the data management program 520 receives a part or whole of a wireless flashcard from the computing device 102. In operation 603, the data management program 520 identifies the wireless flashcard 510 and may operate on the received dataset according to a request and/or the attributes associated with the data fields of the received data template in operation 604.

Some example operations include, without limitation, sort, add, modify, delete, and synchronize. In some implementations, the data management program 520 may receive a sort request, so that the received wireless flashcard and the wireless flashcard 510 can be organized along with the other related wireless flashcards. The sorting may be performed based on the identity information associated with the wireless flashcards. Some example identity information includes, without limitation, alphanumerical identification and color coding. In other implementations, the data manage program 520 may receive a modification request for certain data in a particular data field of the received wireless flashcard. Such a modification request may come from the computing device 102 (e.g., adding a blog entry and replacing dated textual content with multimedia content) or come from completing certain tasks by the receiving computing device 502 (e.g., completing a new search to find the latest information). However, if the data field is assigned with the aforementioned lock attribute, then the data management program 520 is configured to ignore the modification request. On the other hand, if the data field is assigned with an editable attribute, not the lock attribute, then the data management program 520 is permitted to update the data in the data field. In addition, if the data field is also assigned with the aforementioned synchronization attribute, then the data management program 520 is configured to report any modification back to the computing device 102.

In operation 606, the data management program 520 outputs the modified dataset 118 according to the data template 122. The data management program 520 may also be configured to perform the outputting operation based on a set of features specific to the receiving computing device 502. In operation 608, the data management program 520 is configured to optionally merge the modified wireless flashcard from the computing device 102 and the wireless flashcard 510. To illustrate this merging operation, suppose the received wireless flashcard and the wireless flashcard 510 share the same data template but include different versions of data in the datasets. Suppose further that the display window size of the computing device 102 is significantly larger than the receiving computing device 502. In some implementations, the merging operation consolidates the received wireless flashcard and the wireless flashcard 510 into a single wireless flashcard. As a result, the identification of this consolidated wireless flashcard and the identification information for all the other related wireless flashcards may also be changed. The consolidated wireless flashcard may be transmitted back to the computing device 102 and configured to be fitted on the larger display window of the computing device 102, and the same consolidated wireless flashcard is also configured to be fitted on the smaller display window of the computing device 502. In other implementations, the merging operation may keep both the received wireless flashcard and the wireless flashcard 510 but modifies the data or reassigns the attributes associated with the selected data fields within the two wireless flashcards.

FIG. 7 is a block diagram illustrating an example computer program product 700 for supporting a wireless flashcard, arranged in accordance with as least some embodiment of the disclosure. Computer program product 700 includes one or more sets of instructions 702 for supporting a wireless flashcard. For illustration purposes, the instructions 702 are similar to some of the methods described above and illustrated in FIG. 4. Computer program product 700 may be transmitted in a signal bearing medium 704 or another similar communication medium 706. The content of the computer program product 700 may be recorded in a computer readable medium 708 or another similar recordable medium 710.

FIG. 8 is a block diagram illustrating an example computer program product 800 for generating a wireless flashcard, arranged in accordance with as least some embodiment of the disclosure. Computer program product 800 includes one or more sets of instructions 802 for supporting a wireless flashcard. For illustration purposes, the instructions 802 are similar to some of the methods described above and illustrated in FIG. 6. Computer program product 800 may be transmitted in a signal bearing medium 804 or another similar communication medium 806. The content of the computer program product 800 may be recorded in a computer readable medium 808 or another similar recordable medium 810.

There is little distinction left between hardware and software implementations of aspects of systems. The use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes, systems, or other technologies are deployed. For example, if an implementer determines that speed and accuracy are paramount, the implementer may opt for a mainly hardware or firmware vehicle. If flexibility is paramount, the implementer may opt for a mainly software implementation. Yet again, alternatively, the implementer may opt for some combination of hardware, software, with or without firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

Herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A first computing device configured to support a first wireless flashcard having content and in a format specified by a first template, the first computing device comprising:
   a wireless communication module;
   a display device; and
   a processing unit, wherein the processing unit is configured to:
      receive a first data of a first data type and a second data of a second data type,
      determine whether the first data type and the second data type match a first permissible data type and second permissible data type supported by the first template, respectively,
      if the first data type matches the first permissible data type, identify the first wireless flashcard based on the first data,
      if the first data type matches the first permissible data type and the second data type matches the second permissible data type, send the first data and the second data to the display device for display in a first display area and a second display area, respectively, based on settings set forth in the first template and features of the first computing device, wherein the settings include at least data fields, information associated with the data fields, and attributes,
      prior to performing an operation on one or more of the first data and the second data, determine whether the operation is permissible based on one or more of a first attribute and a second attribute set forth in the first template, and
      cause a part or whole of the first wireless flashcard to be transmitted via the wireless communication module to a second computing device based on one or more of a third attribute and a fourth attribute set forth in the first template.

2. The first computing device of claim 1, wherein the first attribute or the second attribute indicates whether data in the first display area or the second display area is editable.

3. The first computing device of claim 1, wherein the third attribute or the fourth attribute indicates whether data in the first display area or the second display area is transferrable.

4. The first computing device of claim 1, wherein the processing unit is further configured to sort the first wireless flashcard and a set of wireless flashcards relating to the first wireless flashcard based on the first data type of the first data.

5. The first computing device of claim 1, wherein in response to receiving a request to add, modify, or delete content in the second display area, the processing unit is further configured to update the second data and display an update history for the second display area if the second attribute indicates that data in the second display area is editable.

6. The first computing device of claim 5, wherein the processing unit is further configured to include a blog entry in the second display area.

7. The first computing device of claim 5, wherein the request comes from the processing unit completing a search to find content for the second display area.

8. The first computing device of claim 1, wherein the processing unit is further configured to:
   operate on a part or whole of a second wireless flashcard from the second computing device via the wireless communication module based on a second template for the second wireless flashcard; and
   display the second wireless flashcard based on the second template and the features of the first computing device.

9. The first computing device of claim 1, wherein the processing unit is further configured to merge a part or whole of a second wireless flashcard received from the second computing device via the wireless communication module with the first wireless flashcard.

10. The first computing device of claim 1, wherein the processing unit is further configured to report any modification made to one or more of the first data and the second data to the second computing device via the wireless communication module if one or more of the third attribute and the fourth attribute indicate to synchronize.

11. A first computing device configured to generate a first wireless flashcard having a first dataset as content and a first template, the first computing device comprising:
   a wireless communication module;
   a display device; and
   a processing unit, wherein the processing unit is configured to:
      receive a first data of a first data type for a first data field of the first template,
      receive a second data of a second data type for a second data field of the first template,
      formulate the first dataset having the first data and the second data if the first data type and the second data type match a first permissible data type for the first data field and a second permissible data type for the second data field, respectively,
      send the first dataset to the display device for display based on settings set forth in the first template and features of the first computing device, wherein the first data field corresponds to a first display area, and the second data field corresponds to a second display area, and
      assign a first attribute for the first data field and a second attribute for the second data field before transmitting a part or whole of the first wireless flashcard to a second computing device via the wireless communication module.

12. The first computing device of claim 11, wherein in response to receiving a request to add, modify, or delete content in the second display area associated with the first wireless flashcard, the processing unit is further configured to:

identify the first wireless flashcard based on the first data; and update the second data and display an update history for the second display area if the second attribute indicates that data in the second data field is editable.

13. The first computing device of claim 12, wherein the processing unit is further configured to include a blog entry in the second display area.

14. The first computing device of claim 12, wherein the request comes from the processing unit completing a search to find content for the second display area.

15. The first computing device of claim 11, wherein the processing unit is further configured to merge a part or whole of a second wireless flashcard received from the second computing device via the wireless communication module with the first wireless flashcard.

16. The first computing device of claim 11, wherein the processing unit is further configured to report any modification made to one or more of the first data and the second data to the second computing device via the wireless communication module if one or more of the first attribute and the second attribute are assigned to synchronize between the first computing device and the second computing device.

17. A non-transitory computer readable medium containing a sequence of instructions for supporting a wireless flashcard having content and in a format specified by a first template, wherein the sequence of instructions when executed by a computing device, causes the computing device to:

receive a first data of a first data type and a second data of a second data type, determine whether the first data type and the second data type match a first permissible data type and a second permissible data type supported by the first template, respectively, if the first data type matches the first permissible data type, identify the wireless flashcard based on the first data;

if the first data type matches the first permissible data type and the second data type matches the second permissible data type, display the first data and the second data in a first display area and a second display area, respectively, based on settings set forth in the first template and features of the computing device, wherein the settings include at least data fields, information associated with the data fields, and attributes;

prior to performing an operation on one or more of the first data and the second data, determine whether the operation is permissible based on one or more of a first attribute and a second attribute set forth in the first template; and transmit a part or whole of the wireless flashcard via a wireless communication module of the computing device to another computing device based on one or more of a third attribute and a fourth attribute set forth in the first template.

18. The non-transitory computer readable medium of claim 17, further containing a sequence of instructions, which when executed by the computing device, causes the computing device to sort the wireless flashcard and a set of wireless flashcards relating to the wireless flashcard based on the first data type of the first data.

19. The non-transitory computer readable medium of claim 17, further containing a sequence of instructions, which when executed by the computing device, causes the computing device to update the second data and display an update history for the second display area in response to receiving a request to add, modify, or delete content in the second display area and if the second attribute indicates that data in the second display area is editable.

20. The non-transitory computer readable medium of claim 17, further containing a sequence of instructions, which when executed by the computing device, causes the computing device to report any modification made to one or more of the first data and the second data to another computing device via the wireless communication module if one or more of the third attribute and the fourth attribute indicate to synchronize.

\* \* \* \* \*